United States Patent [19]

McClay, Jr.

[11] 3,824,695
[45] July 23, 1974

[54] MULTIPLE GAUGING DEVICE

[76] Inventor: Alexander W. McClay, Jr., 1679 Brandon Ave., Petersburg, Va. 23803

[22] Filed: July 10, 1970

[21] Appl. No.: 53,951

[52] U.S. Cl. .............................. 33/137 R, 33/138
[51] Int. Cl. ............................................ G01b 3/10
[58] Field of Search .......... 33/137 R, 138; 93/94 PS

[56] References Cited
UNITED STATES PATENTS

| 748,094 | 12/1903 | Parker | 33/138 |
|---|---|---|---|
| 882,022 | 3/1908 | Schmidt | 33/137 R |
| 1,732,906 | 10/1929 | Morton | 33/42 |
| 2,453,115 | 11/1948 | Brown | 33/137 R |
| 2,581,858 | 1/1952 | Hilt et al. | 33/137 R |
| 2,735,183 | 2/1956 | Taylor | 33/86 |
| 3,145,477 | 8/1964 | Morrison | 33/137 R |
| 3,192,630 | 7/1965 | Pineson | 33/137 R |
| 3,406,456 | 10/1968 | Schleich | 33/107 R |
| 3,418,719 | 12/1968 | Davis | 33/137 R |

Primary Examiner—Louis R. Prince
Assistant Examiner—Steven L. Stephan
Attorney, Agent, or Firm—Wilfred G. Caldwell

[57] ABSTRACT

For use in laying out duct or box-like structures, a gauging device having multiple sides, including appendages in predetermined positions, with rotatable connection means for attaching the gauge to a measuring tape (or it can be integral with a measuring bar), with the appendages serving to position the tape or the bar so as to add various predetermined lengths to the tape or bar equivalent to material lapped or cut away in the fabrication of corner and lap joints or seams with the measuring tape or bar indicating directly in terms of the specified or finished inside dimensions of the structure. The appendages are configurated to enable measuring from points on each of several variously oriented planes.

10 Claims, 29 Drawing Figures

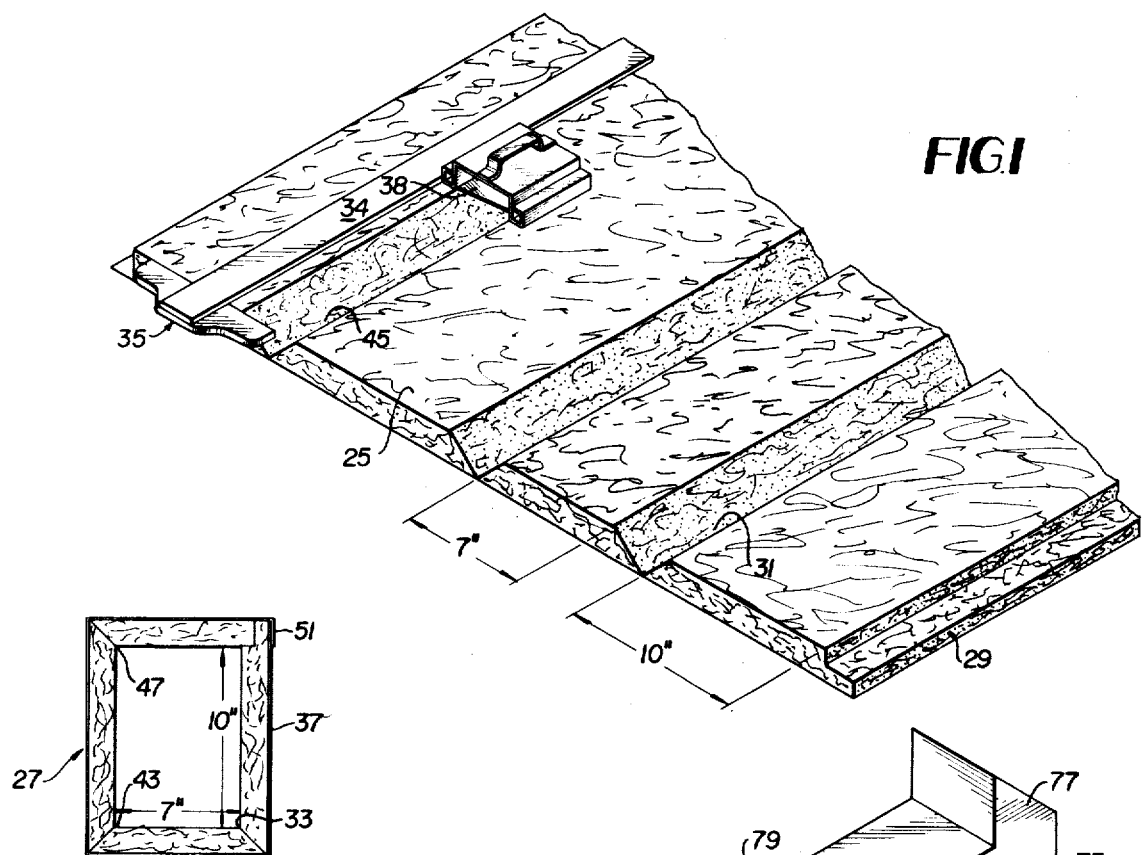
FIG.1
FIG.2
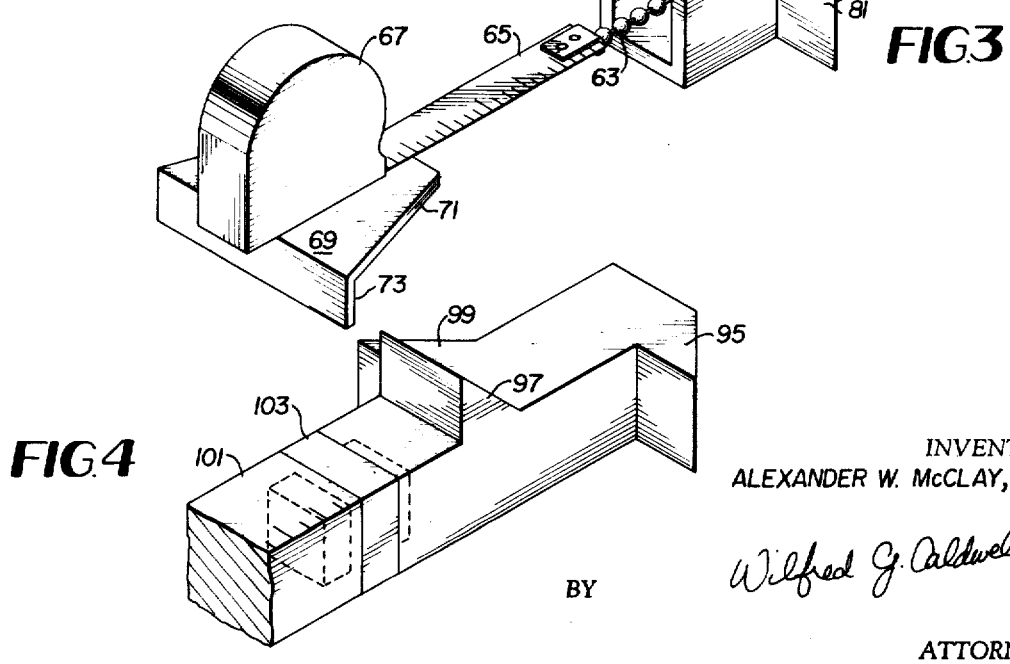
FIG.3
FIG.4
INVENTOR
ALEXANDER W. McCLAY, JR.
BY Wilfred G. Caldwell
ATTORNEY

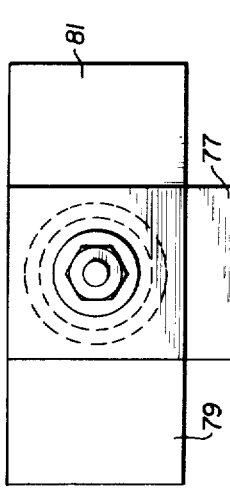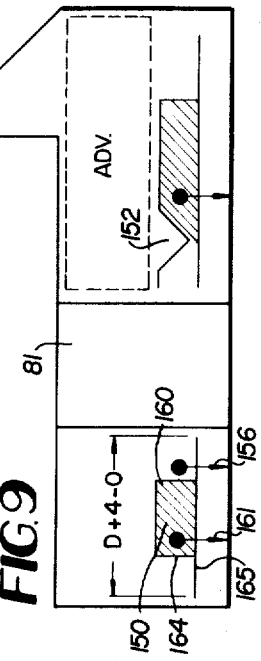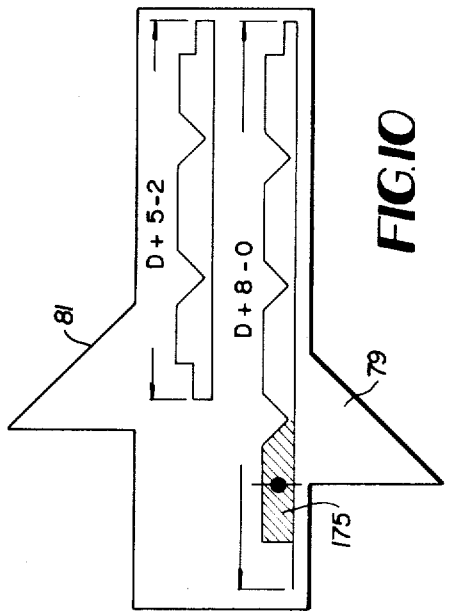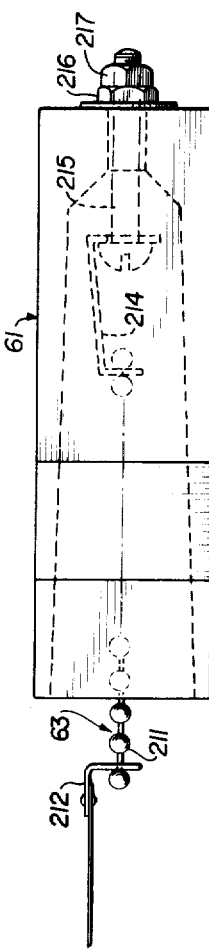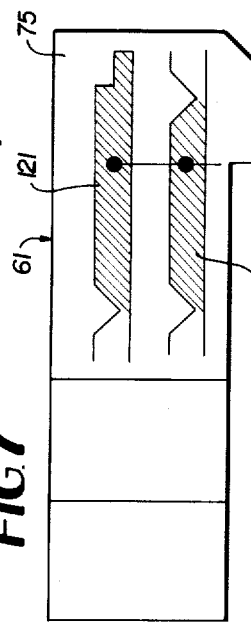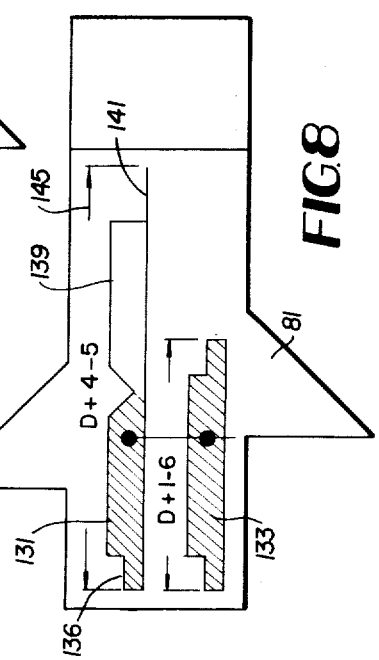

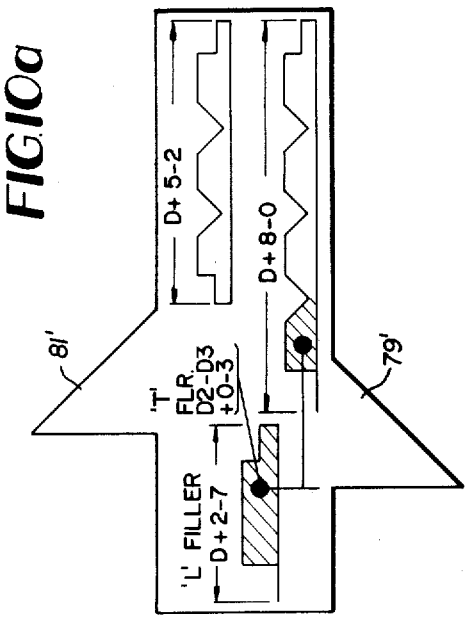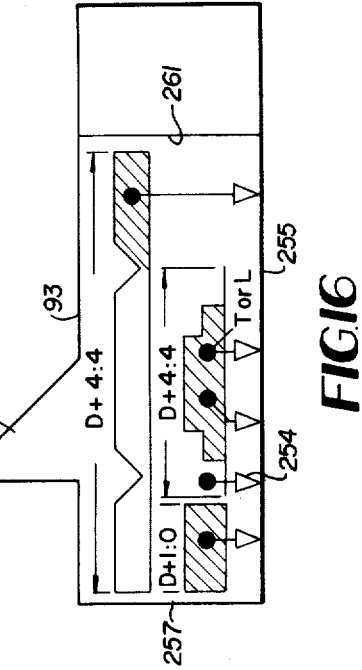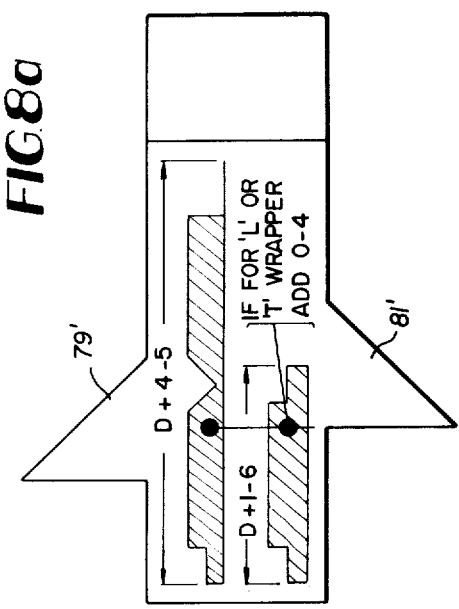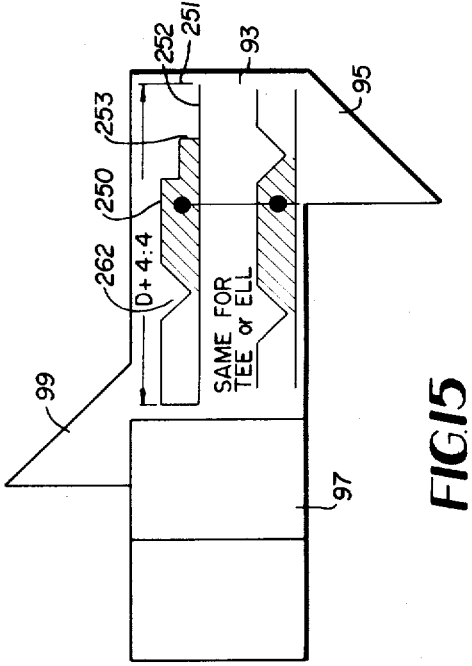

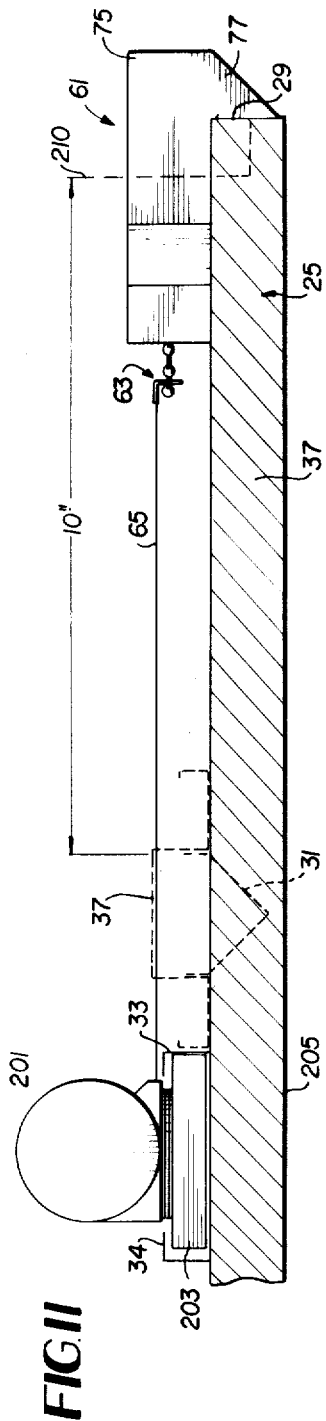
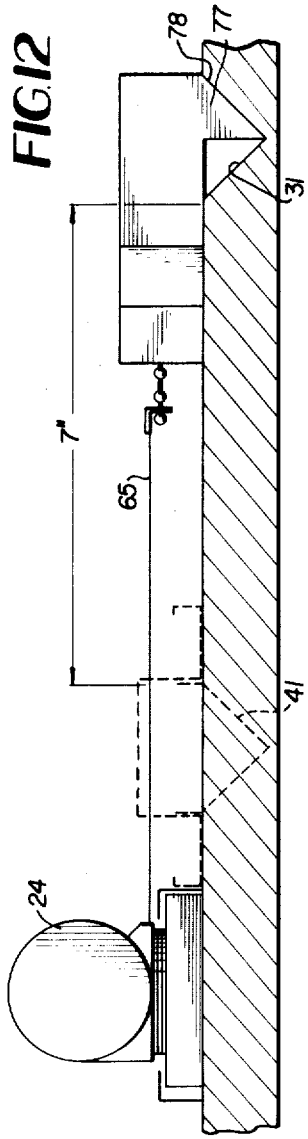
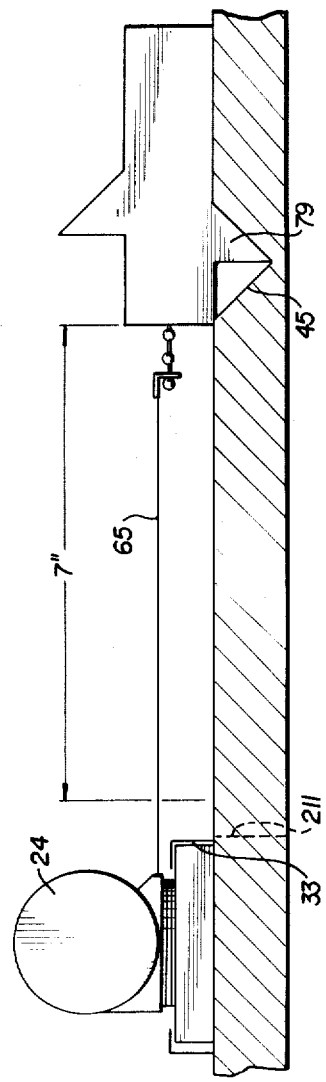
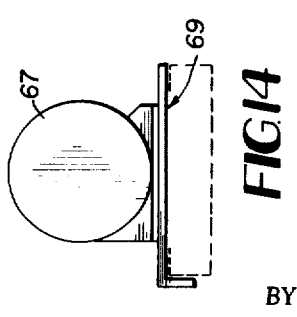

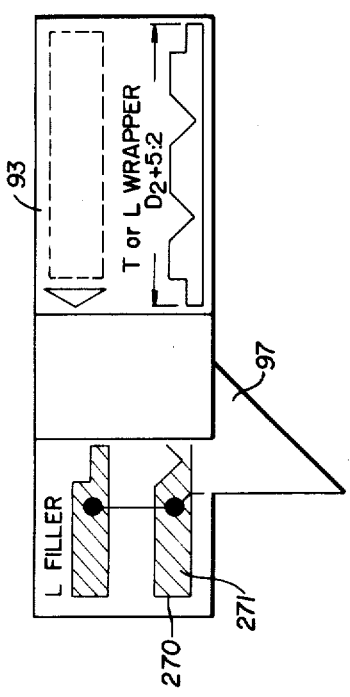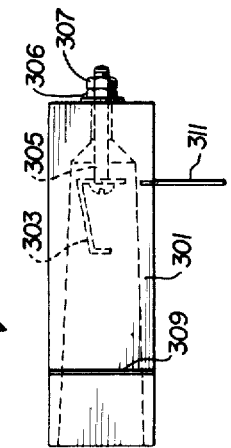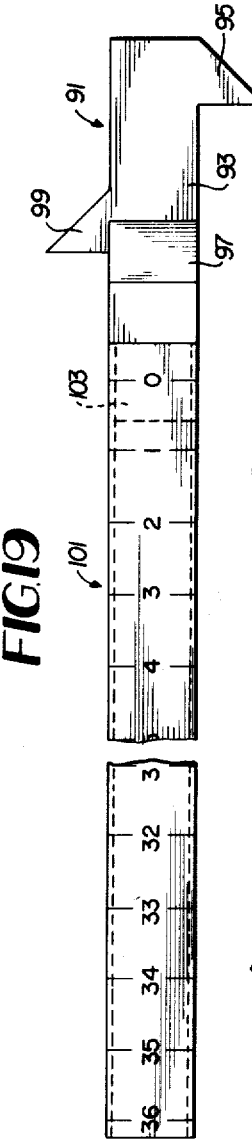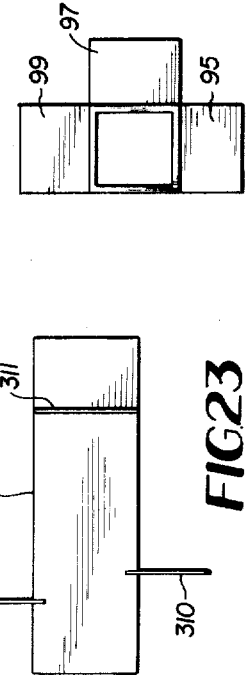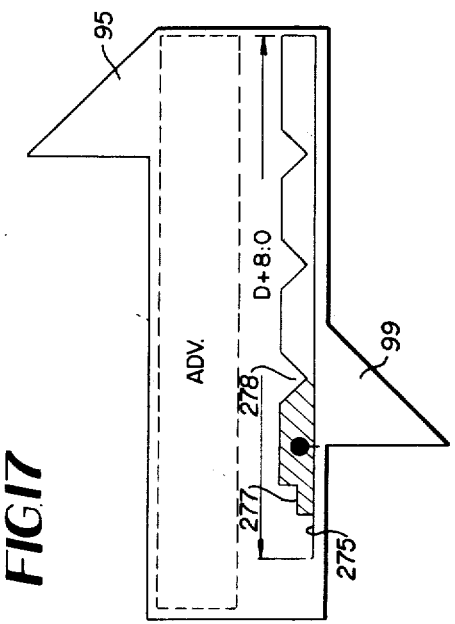

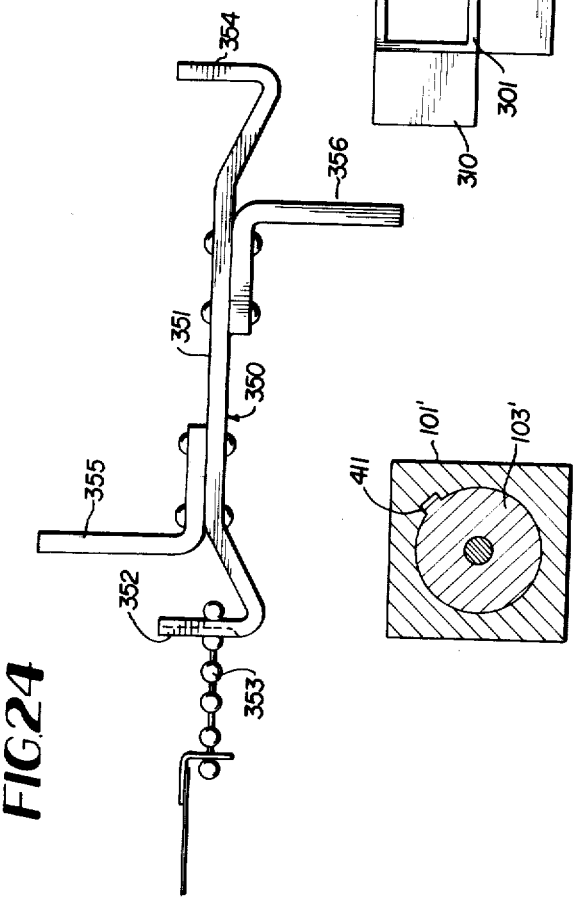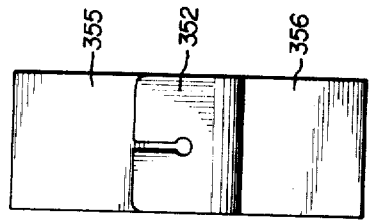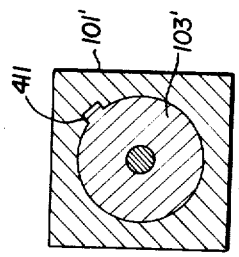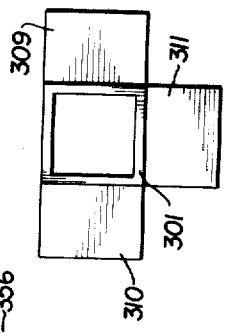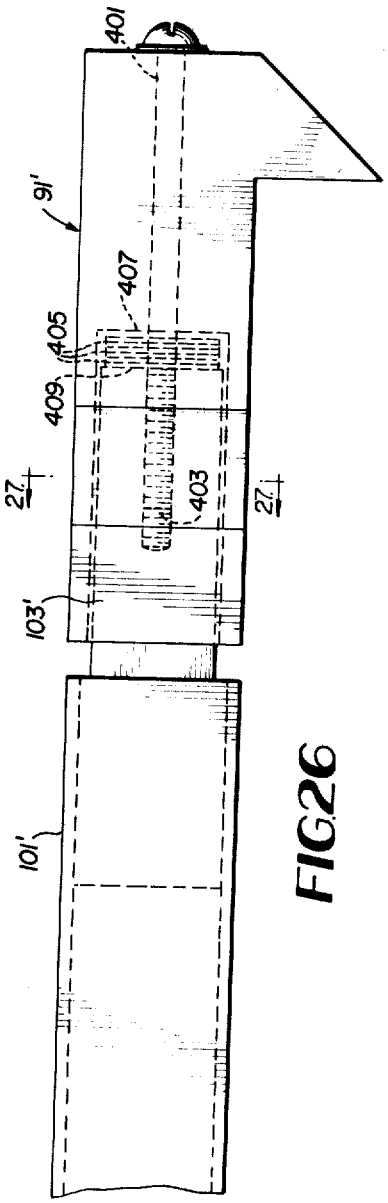

MULTIPLE GAUGING DEVICE

The present invention relates to gauging devices essentially a short, multi-sided bar carrying appendages, locating marks, and certain diagrammatical data along its sides which may be used in rotatable (around its longitudinal axis) attachment with a measuring tape, or rigidly attached to a measuring bar.

The gauging device has the capacity to add several dimensions to the length of the tape, or bar, when measuring horizontally or linearly from, e.g., a mark or point on a horizontal surface, from a dependent vertical face, or from the intersection of two given declining sloped faces, or from the intersection of a declining sloped face and a horizontal face.

The several dimensions are those allowances made in the layout and subsequent cutting of flat stock, of appreciable thickness, for the fabrication of air ducts, conduits of rectangular cross-section, boxes, or box-like structures when the sides of the structures are joined by means of rabbet, butt, mitre, and ship-lap type joints, the devices adding certain predetermined lengths to the measuring tape, or bar, to compensate for the material lapped or cut away and also for the cutter-to-guide-edge width of the cutting tool, in order that the measuring tape, or bar, may directly indicate the guide-edge position for each subsequent cut in terms of the finished, or specified, inside dimensions of the structure.

The invention finds wide-spread use in the layout and cutting of fiber glass duct board manufactured for the fabrication of ducts for air conditioning systems. The material is an insulating board, faced on one side with a thin aluminum sheet which serves as a structural band to hold the sides of the duct together, and also as a vapor barrier. The board is manufactured in three thicknesses, 1, 1½, and 2 inches. The thicker materials, of course, require greater seam allowances, and three different size layout devices are required when working with the three thicknesses, each similar except in length, size and longitudinal placement of the appendages, longitudinal placement of the locating marks, and the numerical data on the sides thereof, but the operating principle being the same.

In a typical example the corner joints of a section of duct are cut across the board, parallel to the short side (normally 4 feet), and if the length (normally 10 feet) of the board is sufficient, the joints of the four corners are cut. The two end cuts are then fastened together to form the finished section, the duct having been made, in this instance from one continuous piece, in the following manner:

The board is placed on a work table with the aluminum facing next to the table. The first cut is made by a knife, vertically through the board, including the aluminum facing (note this cut is not necessary if the edge is in "as manufactured" condition). The next three cuts are grooves formed by the intersection of two 45° mitre faces forming at the bottom of the groove an included angle of 90° with its vertex located slightly above the aluminum facing. These grooves are cut by a special tool. The next to last cut is made by a knife, vertically through the fiber glass but not through the aluminum facing. A short distance from the latter cut, a second knife cut is made through both the fiber glass and the aluminum facing. The fiber glass between these two latter cuts is then cut away from the aluminum facing leaving a flap or tab (this latter fiber glass edge will hereinafter be referred to as a butt edge). Next, a special tool is used to cut a rabbet out of the top face of the board and along the edge of the first knife cut (an edge so formed will hereinafter be referred to as a rabbeted edge, whether actually rabbeted, or only a vertical knife cut to be rabbeted later) this to form a pocket to receive the above butt edge with its adjoining tab to be used to overlap the outside corner, At this point, all that is necessary to form the duct is to bring the first side up to a vertical position, the same for the third side, the fourth side is swung up and over to mate its butt edge into the rabbeted edge of the first side, bend the tab over the corner thus formed, staple it down (to the outside face of the first side) and seal the edge of the tab with a special tape.

However, before the board is folded to form a duct, the above mentioned rabbeting tool is moved along one of the edges normal to the corner seam cuts, cutting a rabbet out of the top surface of the board; a second rabbeting tool is moved along the opposite edge of the board to cut a rabbet in the bottom surface of the board, just above, and adjacent to the aluminum facing. These latter cuts form the male and female edges of ship-lap joints used to join one section of duct to another.

In order to fabricate ducts of large cross-sectional area, and also, in order to reduce waste, it beomes necessary, rather than making the duct from one continuous piece of board, as described above, to make the duct from four separate pieces, or of two L-sections, or by means of a U-section and a cap piece. Air conditioning duct sizes are always given, or specified, in terms of the inside width and depth dimensions (the terms "dimension," "width of cut," "length," "allowance," and "distance," unless otherwise qualified shall be herein construed to have reference to only that direction along the board normal to the direction in which the corner seams are cut). With this in mind, and in view of the fact that all but one of the above joint cuts affect the inside dimensions, and also mindful that continuous corner joints are formed by two intersecting mitre cuts, and that non-continuous corner joints are made up of a rabbeted edge, a mating butt edge, and a stapling tab, and again mindful that, thus far in the interest of simplicity of description, nothing has been mentioned regarding the layout of elbow and tee fittings; it becomes quite apparent that the dimensional allowances that must be made, to compensate for the material lapped, or cut away, etc., are many and varied.

In addition to the above, it must also be determined whether the remaining board, or potential scrap, is large enough for the fabrication of ducts, to desired sizes, by means of joining two L-sections, or by joining a U-section with a cap piece, or by joining four separate pieces, or ideally, in one piece, as outlined above, the required length of board being, of course, the total of the pertinent side dimensions plus the total of the pertinent seam allowances.

Currently, there are two methods of coping with the above, as set forth by the manufacturers of duct board; briefly as follows; the first is called the "guide edge method," in which the same allowances pertaining to the first side are added to the given side dimension, and from this is subtracted the center-to-guide-edge width of the grooving tool, to give a subtotal; to this sub-total is added the seam allowances and the given dimension of the next side, to give the next sub-total, etc., continuing for the rest of the sides. Then, beginning at the lower left hand corner of the board for each measurement, each of the above sub-totaled dimensions is marked along the lower edge and the same dimensioning is repeated, beginning at the upper left hand corner. These hand constructed marks locate the position of the straight edge against which the cutting tool is guided. The reason for beginning at the left hand of the board, and for the one subtraction, is that this places the guide edge on the left hand side of the subsequent cut, allowing the cutting to be done with the right hand and also it assures that the guide edge will be on the board in the event that the board is no longer than that necessary from which to cut the section. These many necessary calculations require addition and subtraction of fractions with attendant errors and heavy loss or scrap of duct board.

According to one of the board manufacturer's fabrication manuals, contractors using the board evidently thought this method unnecessarily complicated, and developed the "center-line" method, which is the same as the foregoing except that the guide edge is omitted. This done away with the above subtraction and also allows the dimensioning to begin at the left, or the right hand edge. The dimensions are marked along both the upper and lower edges of the board, as in the foregoing. Then, using a straight edge, lines are drawn, across the board, between the corresponding dimension marks; these are the center-lines of the subsequent cuts. The center of the grooving tool is marked on top of the leading edge, and the cuts are then made free-hand, lining up the mark on the tool with the line on the board. (There are two problems here: one is that, due to the abrasive nature of the material, the workman spends an appreciable amount of time sharpening pencils; the other is that the mark on the grooving tool being about an inch above the line on the board, is the workman's line of vision is not exactly normal to the board the cut is not accurately made, and this, when the board is folded to become a section of duct, causes the corners of the duct to be "out of square," which, of course, causes difficulty when joining one section of duct to another, and particularly when the adjacent section is out of square in the opposite direction.)

The manufactuers make available to the contractors, pads of work-sheets, in three different forms, showing cross-sections of the board with various combinations of corner joint cuts, etc., the main portion of the sheet containing ruled in areas in which are to be inserted the given duct dimensions, and between these areas the seam allowances are printed, apparently in an attempt to reduce the probability of error. The manufacturer also recommends that once these work-sheets are filled in, for given duct sizes, they be filed for future reference.

The invention herein described, reduces all of the above to a very simple, straight-forward, and accurate procedure, even for the inexperienced.

The gauge is attached to a measuring tape in one embodiment, as mentioned earlier. The tape is merely a spring return type with capacity to measure 6 to 8 feet. The housing of the tape is mounted in such a way that it may be removably, or rotatably (around a vertical axis) carried on the blade (straight-edge portion) of a T-square. The alternative structure to the rotatable one comprises a roll-up tape on a clip, or plate with depending flange, which is carried by the T-square and which practically falls out of the way after each use.

In using the present invention, the board is placed on the cutting table with its aluminum facing against the table. The blade of the T-square is placed across the duct board (in the direction in which the corner seams are to be cut), and with its head bearing against the long side of the table adjacent to the worker. It is now only necessary to properly position the gauge at the right hand edge, or at the immediately preceding cut to the right of the T-square, as the case may be, move the T-square to the left until the right hand edge of the blade coincides with the measurement (i.e., the desired known inside dimension of that side of the duct) as indicated on the tape, and the blade is in the correct position to provide the guide edge for the subsequent cut.

On each side of the gauge are shown certain diagrammatical data which generally depicts the sides of duct in stretchout cross-section. The portions of these sections containing diagonal lines, circular marks with lines extending therethrough to appendages, or to locating marks, represent the sides having those particular combinations of corner joints for which the correct lengths are added, to that shown by the tape, by positioning the indicated appendage, or locating mark, at the immediately preceding groove cut, or knife cut, or butt edge, as the case may be. This will be explained in greater detail in reference to the drawings.

Also, in the diagrammatical data, in addition to the above cross-sections containing the diagonal lines, which are used as above indicated, there are cross-sections which are shown in outline only. These are included only for information as to the length of board, in addition, to the dimension, or sum of the dimensions, respectively, of the side, or combination of sides, required to cut said side, or combinations of sides including the related combinations of corner seams. This will also be further explained in connection with the description of the drawings.

With the foregoing in mind, it is among the objects of this invention to provide apparatus for gauging purposes wherein, in connection with a linear measuring arrangement, the present invention directly adds any of several predetermined dimensions to the scale of the linear measurer when measuring from points on each of several variously oriented planes.

Another object of the present invention is the provision of a measuring gauge, per se, which has a body and appendages related thereto in predetermined fashion.

It is another object of the invention to incorporate such a gauge with a marked bar or linear extendable measuring device.

Yet another object of the invention is the provision of apparatus incorporating the use of the invention in conjunction with a T-square or straight edge for laying out duct and duct fittings to desired inside dimensions.

Finally, a still further object, is the provision of a gauging device using the described principle which device is simple, straight forward, accurate, and readily useable by the inexperienced.

The invention will be better understood from a reading of the following detailed description thereof, when taken in the light of the accompanying drawings wherein:

FIG. 1 is a view in perspective showing a typical stretchout of a board to be fabricated into duct, FIG. 2 is a view in end elevation of the duct fabricated from the board of FIG. 1, FIG. 3 shows in perspective a gauge of the present invention in connection with a reelable linear measuring device, FIG. 4 is a view in perspective of a modification of the gauge of FIG. 3, depicted in association with a linear bar measuring device.

FIG. 5 is a view in side elevation with dotted interior construction of the gauge of the first embodiment, FIG. 6 is an end view of the structure of FIG. 5, FIG. 7 is a view in side elevation of the gauge of FIG. 5 showing a first side thereof, FIG. 8 shows the second side of the same gauge, FIG. 8a is a view similar to FIG. 8 except that the indicia associated with the operative appendages has been modified, FIG. 9 shows a third side of the gauge of FIG. 5, FIG. 10 shows a fourth side of the gauge of FIG. 5, FIG. 10a shows the fourth side of the gauge of FIG. 5, but with different indicia for use with the operative appendages thereof, FIG. 11 is a view partly in section and partly in side elevation showing the gauge of FIGS. 3 and 5 in operative relation to a duct board, for a first mitre or groove cut, FIG. 12 shows the structure of FIG. 11 positioned in the former groove cut and measuring for a second groove cut, FIG. 13 shows the above structure advanced along the board for the next cut, FIG. 14 shows an alternate structure for mounting the reelable measuring tape for use in the subject invention, FIG. 15 is a view in side elevation of the first side of the gauge of the second embodiment as shown in perspective in FIG. 4, FIG. 16 shows the second side of this embodiment, FIG. 17 shows the third side of this embodiment, FIG. 18 shows the fourth side of this embodiment, FIG. 19 is a view in side elevation of the gauge of this embodiment in relation to the linear measuring bar, FIG. 20 is an end view of the structure of FIG. 19, FIG. 21 is a side view of a third embodiment of the gauge of the present invention showing the internal construction in dotted outline, FIG. 22 is an end view of the structure of FIG. 21, FIG. 23 is a top view of the structure of FIG. 21, FIG. 24 is a view in side elevation of a further embodiment of the gauge of the present invention, FIG. 25 is an end view of the structure of FIG. 24 without the connection means, FIGS. 26 and 27 show the gauge adjustably attached to a linear measuring device.

Referring now to FIG. 1, there is illustrated a typical material 25 from which it is desired to fabricate, for example, the structure 27, shown in FIG. 2. For purposes of the present description, it will be assumed that the material 25 is a fiber glass duct board and it is desired to use this board to fabricate the duct 27 of FIG. 2, knowing the inside dimensions of the duct. It is, of course, necessary to cut the several grooves in the correct positions in order that the board 25 can be folded and secured in the configuration of the duct 27 while maintaining a high degree of accuracy to the predetermined dimensions. Measurements progress from the right hand face 29 of board 25 toward the left, forming cuts and grooves in sequence. The first cut will square or true the edge 25, unless it is already in such condition as received from the manufacturer.

The next cut, or the first groove cut, is that necessary to form groove 31 which enables bending of the board to define corner 30 of duct 27. Thus, a distance is laid out from edge 29 to either edge or to the center of groove 31 being formed, which positions guide edge 33 of the T-square 35 so that the cutter of the grooving tool 38, guided against the edge of the T-square, will form the groove in proper relation to the beginning edge 29 so that the side 37 so cut will be of the correct dimension when the duct is assembled. Then, in succession, cut 41 is made to form corner 43 in similar fashion, cut 45 is made similarly to form corner 47, next, a knife cut is made, vertically through the fiber glass to, but not through, the aluminum foil, to form a butt edge (x), and finally a last cut is made to provide for a tab 51 (see FIG. 2) which will overlap side 37 when the duct is formed, the beginning edge of side 37 being rabbeted to receive the butt edge (x).

In FIG. 3, a first embodiment of gauge 61 is shown with rotatable connection means 63 linking the same to a tape 65 reelable into and out of housing 67. Housing 67 is in turn fixed to a base 69 comprising a horizontal reach 71 and a vertical reach on depending flange 73.

In general, it will be noted that the gauge 61 includes a body 75 and appendages 77, 79, and 81 extending outwardly therefrom at predetermined locations. The use of this device will further be explained in connection with the detailed showings of figures later to be described.

In FIG. 4, there is shown in perspective, a second embodiment of the invention which comprises a modified gauge 91 having a body 93 and differently located appendages 95, 97, and 99. This gauge is connected to a linear measuring device comprising bar 101 by any suitable means, as for example, the plastic tenon plug 103 extending between the hollow interiors of body 91 and bar 101.

It should be noted at this point that gauges 61 and 91 are interchangeable relative to linear measuring devices, and either may be used with any type of linear measuring device available, including even, e.g., yard sticks or strings.

FIGS. 7–10 show the respective sides of the gauge 61 of FIGS. 5 and 6 with attachments for receiving a linear measurer.

In FIG. 7, a first side view, there is shown the appendage 77 in the lower or working position on the body 75 of the gauge 61 and immediately above appendage 77, but on body 75, are shown two diagonally linked, cross-sectional diagrams 121 and 122, of sides of a duct, each having a different combination of corner joints. In cutting the side of 121, the vertical face of appendage 77 is hooked over the right hand edge 29 of the board 25 (see FIG. 11), corresponding to the right hand edge of the side depicted in diagram 121, which, at this point, has not been rabbeted, and the tape 65 to which the gauge 61 is attached, is pulled to the left. The blade 34 of a T-square 35, placed beneath the tape 65 will have its guide edge 33 located at the correct position for the mitre cut 31 at the left of side 37 when its guide-edge 33 coincides with the desired inside dimension of the duct, as read directly from the tape at the number corresponding to the inside dimension. The configuration of diagram 122 is cut in like manner, except that the sloped face of appendage 77 is held against the far sloped face 78 (see also FIG. 12) of the immediately preceding mitre or groove cut 31, which positions the vertical face of the appendage directly above, and in register with, the intersection of the two mitre faces, making unnecessary any need for visual inspection.

FIG. 8, a second side view, shows appendage 81 in the working position. On the body of the gauge, and immediately above appendage 81 are two diagonally lined cross-sectional diagrams, 131 and 133, each depicting a different combination of corner joints. In cutting the side of diagram 131, the sloped face of the appendage 81 is held against the far side of the groove cut to the right of the side, and the guide-edge positioned as explained previously. In this case the cut is made with a knife, vertically through the board; the rabbet 136 shown in the cross-section of 131 is made later, with a special rabbeting tool which is guided by the top surface and against the vertical edge of the board 25, made by the cut just mentioned.

Attached to and extending to the right of the section 131 is a side 139 shown in outline only, and extending to the right of section 139 is a stapling tab 141. These two sections 131, 139 and the stapling tab 141 comprise an L-section, two such complementing L-sections being joined to form a complete duct section.

Above this combination of sides is shown a dimension line 145 and the numerical data "D + 4 - 5" which means that the total length of the board required to cut these two sides, plus the allowances for the corner joints, plus the stapling tab 141 is the sum of the side dimensions "D" plus four and five eighths inches. (All dimensions so shown in the drawings are in inches and eighths.)

The side 133 shown just below 131 is cut in like manner except that the vertical face of the appendage 81 is hooked over the right hand edge of the board. As this cross-section is used as two opposite sides of a four piece duct section, above it is shown the length of board required, i.e., D + 1 - 6.

In FIG. 9, a third side view, shows cross-sections of two sides 150 and 151, containing corner joints, all of which with the exception of one 152, are butt edges with adjoining stapling tabs. Cutting the fiber glass material from stapling tabs is more quickly and conveniently done as a last operation; therefore, locating or register marks are shown adjacent to a plane lower surface 155, the selected locating mark being placed directly over the mark made by the knife during the prior cut, when measuring therefrom to position the guide-edge for the subsequent cut. For example, in cutting the side 150 with its adjoining stapling tabs, the locating mark 156 is placed so that it is directly over the right hand edge of the board, the measuring tape drawn to the left, and, as the stapling tap is not a part of the inside dimension of the duct, the guide-edge is placed at the "0" end of the tape, and the fist butt edge cut 160 is made. The locating mark 161 is placed over the latter knife cut 160, the guide-edge and tape moved to the left until the guide-edge coincides with the inside dimension of the side, as indicated on the tape, and the second butt edge cut 164 is made. The second stapling tab 165 is cut in a manner similar to the first, the locating mark 156 being placed over the knife mark made during the latter butt edge cut 164, etc. Two of the 150 cross-sections are used as opposite sides of a four pice duct section (with two of the 133 (FIG. 8) cross-sections mentioned above), and so the length of the material required to cut the section together with its stapling tabs, is shown above it.

The cross-section 151 is cut similarly to the above, the locating mark 170 is positioned over the knife mark made by the butt edge cut, etc.

FIG. 10, a fourth side view, shows appendage 79 in the lower or working position. On the body 75 of the gauge 61 and immediately above the appendage 79 is shown a diagonally lined cross-section of a side of a duct 175. The guide-edge is positioned and the side is cut, similarly to the above described (see FIG. 13).

Extending to the right from the section 175 are three side cross-sections, shown in outline only, which together with the section 175 comprise those sides, and corner joints required to fabricate a section of duct from one continuous piece of material, and so, above this series of sections is shown the length of material required (D + 8 - 0). Above said series, is a second series of sections, shown in outline only, which make up those sides and corner joints required to fabricate a U-section, and so, above this series is shown the length of material required (D + 5 - 2). (Note a U-section plus a cap piece 150 make up a duct section.)

It will be noticed that the gauge provides for positioning the guide-edge from each of the joint types to each of the others, which allows the worker to reverse the cutting sequence, if so desired.

The gauge, as above described, without modification, is applicable in the lay-out of duct fittings, such as tees, elbows, and transitions (a transition is a more or less straight through fitting which changes during the course of its length, from a rectangular section of given dimensions to that of different dimensions, or to a like, or unlike, section located on a different longitudinal center-line) when these are fabricated by means of joining four separate pieces, in a manner similar to that in which sheet-metal craftsmen make similar fittings from steel sheets. However, one of the manufacturers of fiber glass duct board has developed a method for fabricating tees and elbows which is much more direct and less time consuming, and incidentally, one for which the board is ideally suited, in that an elbow is made up of only two pieces, and a tee, in never more than two pieces, and under certain circumstances, it may be made in only one piece. Thus FIGS. 8a and 10a are shown as alternates to FIGS. 8 and 10 with the former diagrammatical and informational data modified to include the above indicated methods for fabricating tees and elbows, following the principles herein described.

FIG. 11 shows the gauge in operation, as used in positioning the guide edge for a first mitre, or groove cut, in a sequence of corner joint cuts as made in fabricating a duct section from one continuous piece of duct board, as will be further shown in the following figures. The housing 201 of a spring-return type measuring tape 65 is fixedly mounted on a circular block 203, or disc, which in turn, is loosely carried within a channel type blade 34 of T-square 35 so that the housing is free to be rotated around a vertical axis. The gauge is shown with its appendage 77 hooked over the right hand edge 29 of the fiber glass board 25 placed so that the aluminum foil 205 to which the fiber glass is bonded, is on the lower side. The guide edge 33 is moved to the left until the desired inside dimension of that side of the duct, as indicated by the tape (e.g., 10 inches) coincides with the guide-edge. The gauge 61 is lifted and brought toward the guide-edge 33, allowing the tape 65 to be retrieved into the housing 201, then moved, rotating the housing, so as to clear the guide-edge. Mitre cutting tool or grooving tool 37 is moved across the board 25, and in contact with the guide-edge. The groove cut, so executed, will measure 10 inches from the intersection of the right hand face of the groove cut with the surface of the board, to the vertical dotted line 210 near the right hand edge of the board. (The above dotted line, together with the adjoining horizontal dotted line, enclose that portion of the board later removed by a rabbeting tool.)

The gauge 61 is rotatably connected to tape 65 through chain 211 set in angle 212 in turn riveted to tape 65. The opposite end of chain 211 is connected to a yoke 214 in turn anchored by bolt 215 through jam nuts 216 and 217. This construction permits ready use of all sides of gauge 61 and allows longitudinal adjustment of gauge 61, and particularly its measuring appendages and indicia relative to the zero on tape through movement of nuts 216 and 217. This adjustment permits cutting of the duct slightly larger or smaller, e.g., for fitting it to metal duct.

The tape zero is offset from the body 75 to provide maximum movement of the gauge relative to the tape to avoid damage.

It is interesting to note that while the gauge has a plurality of predetermined measurements and configurations or defining arms or appendages, nevertheless the duct may be cut and formed to any size desired including a zero opening.

FIG. 12 shows the gauge with its appendage 77 positioned in the former groove cut (31), and the guide-edge moved to the left into position for a second groove cut 41, which in this case, is for a side with an inside dimension of 7 inches.

A third groove cut 45 is made similarly to the above, except spaced for an inside dimension of 10 inches, and the side so cut will be located opposite the side 37 already cut.

FIG. 13 shows appendage 79 positioned in the third groove cut 45, the guide-edge 33 moved to the left to coincide with the 7 inches mark on the tape. At this position of the guide-edge, a knife cut is made (dotted line 211) through the fiber glass, and to, but not through the aluminum vapor barrier, to form a butt edge which is to fit into the rabbet, which is to be cut in the beginning edge shown in FIG. 11 as mentioned above.

In FIG. 14, is shown the alternative method of mounting the tape housing 67 (see FIG. 3) wherein the housing is fixedly mounted on a flanged plate 69, in a manner allowing the assembly to be carried on the blade 34 of T-square 35 by hooking the flange 73 over the left edge of the blade 34. This is advantageous, under some circumstances, as compared with the disc mounting, in the lay-out and cutting of duct fittings due to the craftsman being concerned with the length of the sides, as well as the width, the plate and flange mounting, of course, being instantly removable from the blade, proves more convenient in laying out the length measurement. Also the edge of the mounting plate, opposite the flange, being wider than the tape, serves as a guide for the pencil mark.

While the embodiment of the invention just described is one embodiment, the gauge 91 of FIG. 4, which is pictured in greater detail in FIG. 15 through 20, will now be described because it more conveniently handles the situation where the sealing or stapling tab is provided at the right hand side of the board, which is the rabbeted face or edge. To achieve this, one appendage has been changed from one face of the gauge to another face and the diagrammatical representations rearranged accordingly.

While the gauge body 93 is shown connected to measuring bar 101, it will be appreciated that the gauge 91 may be employed with the reel 67 and tape 65 through use of the connection 63 of FIG. 3.

The right hand end of the board, which is to include the sealing tab, is pictured in the diagram 250 applied to the first side of the body 93, shown in FIG. 15. The right hand edge of the board corresponds to the vertical line 251 and the sealing tab is shown at 252. Thus, it is necessary to make a cut to form edge 253 as the first step in forming a duct with the tab on the right.

The cut is made at face 253 by using the data on the second side of body 93, as shown in FIG. 16. The right hand edge 251 of the board (corresponding to line 251 of FIG. 15) is aligned with arrow 254 on the plane surface 255 of gauge 91. Then the tape or bar zero (not shown in FIGS. 15 or 16), which is offset approximately one-half inch to the left of the forward end 257 of body 93, marks the position on the board for the first knife cut corresponding to the vertical surface 253 of FIG. 15.

Next, since the material is not removed from the tab until later, the gauge 91 is merely slid forward until surface 261 of appendage 95 is directly over the first cut, i.e., vertical wall 253. Then the tape is drawn out to the first measurement, e.g., 10 inches, and the first groove 262 (see FIG. 15) is formed. It may be appreciated that both the cut and first groove were located by the plane surface 255 of body 93 without rotating the gauge 91.

In the manner heretofore explained, appendage 95 (FIG. 15), upon rotation of the gauge provides the anchor for laying out from groove to groove; and then again from the new groove to the last groove, thereby inherently incorporating dimensional accuracy in the stretchout.

For the left hand vertical wall or butt cut, shown at 270, in diagram 271 pictured on the fourth side of the body 93 in FIG. 18, appendage 97 is used to measure from the third groove and locate the cut line 270.

It may be appreciated that the third side, shown in FIG. 17 positions the measuring means for cutting from a groove to a rabbeted edge, a necessary function in cutting tee and elbow wrapper pieces, and also completes the sequence of cut combinations in the reverse of the order so far described, allowing the worker to lay-out, and cut, in either sequence.

In FIGS. 19 and 20, the gauge 91 is shown attached to a square hollow alignment bar 101, marked in inches from 0 to 36 or 45 inches, for example. The plastic plug 103 is pictured as holding the two components together and the various appendages are identified by the same numbers heretofore employed. It will be appreciated that this bar is marked in inches on all four sides in order that it also may be rotated to bring into play the plane surface 255 (FIG. 16) of the gauge, free of protruding appendages.

In FIGS. 21 through 23, there is shown a further modified version which employs only fins or the like protruding therefrom to replace the forward vertical surfaces of the appendages. The same body construction is used with the body 301 being comprised of a substantially hollow injection molded plastic or even assembled wooden square configuration having therein the connection 303 carried by bolt 305, adjustable by nuts 306 and 307 to operate as heretofore. However, the forward appendage is now depicted by fin 309 with the next appendage at 310 and the rear appendage at 311. The disadvantage of using this configuration is, of course, that there is no rear slope on any of the appendages to fit the rear sloping wall of a groove and thus the fin must be maintained vertically in the center of the groove. This requires visual inspection, whereas the prior described embodiments do not, but rather may be held in place by feel.

Finally, FIGS. 24 and 25 show a further simplified version of a gauge 350. Gauge 350 is fabricated of bent strip aluminum or steel with the body portion 351 forming the forward end 352 for serving as a connector for chain 353, and the rear end 354 serving as a rest or stop for sitting on top of the board when either of the appendages 355 and 356 is being used. The disadvantage of this embodiment is that there is no surface to carry indicia to guide the mechanic, nor will it lay out from vertical face to vertical face. Of course, however, it is quite inexpensive and otherwise useful.

In FIGS. 26 and 27, the gauge 91' is shown adjustably connected to the bar 101' through the use of bolt 401, which is threaded at 403 to engage threads in the tenon 103' or in a metal threaded insert in the tenon 103'. A plurality of shims 405 is provided to fix the adjusted distance between the rear wall 407 of gauge 91' and the front wall 409 for tenon 103'. Thus the effective layout long available from this measuring arrangement is adjustable.

In FIG. 27 it may be seen that a groove and key-way 411 is provided to prevent the bar 101' from being rotated relative to the gauge 91'.

What is claimed is:

1. Gauge means for positioning a guide-edge along a structural board from a vertical surface or from a sloping surface formed by edges, cuts or grooves therein for tools for cutting along those lines which yield given inside dimensions of structures being fabricated, comprising in combination, a multi-sided gauge body, a linear measurer, and means extending at least between the gauge body and the linear measurer for rotatably connecting one to the other, said gauge body together with the portion of the connecting means between the gauge body and the linear measurer delineating several predetermined distances for addition to the distance indicated by the linear measurer; and said gauge body, comprising at least one appendage located along each of at least two sides thereof, said appendages each having a vertical and a sloping surface conforming to said surfaces of the board, either of the appendages being selectable by rotation of the body relative to the linear measurer, and said appendages selectively serving to position the gauge by contact with a vertical surface of the board or a sloping surface of the board.

2. The gauge means of claim 1 further comprising means for adjusting the length of the connecting means.

3. Gauge means for locating the position of a guide-edge along which cutting tools may be guided to make vertical cuts or groove cuts consisting of two mitre faces in structural board to structure corners in the fabrication of sides of ducts and like structures to required inside dimensions comprising in combination, linear measuring means, a multi-sided gauge body; said body comprising means for rotatably connecting it to the linear measuring means; said body configurated to add several predetermined totals of those distances equivalent to the allowances necessary for the cutting tools and grooves cut to fabricate corners so that the sides adjacent thereto will structure to said required inside dimensions and so that the linear measuring means will indicate the position of said guide-edge directly in terms of said inside dimensions; and the configurated body comprising at least one appendage located along at least each of two sides of the body to accurately determine the position of the body relative to the surfaces of the board formed by the edges thereof or cuts therein, and said appendages each having at least two surfaces conforming respectively to said cuts of said board, and a selected appendage being brought into use by rotation of the gauge body relative to the linear measurer.

4. The gauge means of claim 3 further comprising means for adjusting the length of the connection means.

5. A gauge for locating the position of a guide-edge along which cutting tools including grooving tools may be guided to cut and selectively remove material from a structural board initiating the location of the guide-edge from an edge of the board to form corner joints for fabrication of ducts and like structures; said gauge comprising a multi-sided gauge body and alignment means carried on selected sides thereof; a linear measuring tape, and means for rotatably connecting the gauge body to the linear measuring tape so that various ones of the alignment means may be selectively brought into position by rotation of the gauge body about its longitudinal axis relative to the tape to add various predetermined lengths to the measuring means to compensate for the width of the material removed by the grooving tool, and to compensate for that portion of the width of the grooving tool equivalent to one-half the width of the groove plus the distance between the adjacent edge of the groove and the guide-edge when the groove cutting tool is against the guide-edge so that the measuring means may indicate the position of the guide-edge relative to the adjacent cut, groove, or edge directly in terms of the specified inside dimensions of the structure being fabricated.

6. The gauge of claim 5 further comprising a housing for reeling said tape; and means supporting the housing for movement thereof relative to the board.

7. A gauge means in combination with a flexible, tape-like measuring means, said gauge means comprising a multi-sided body; a plurality of alignment means spaced along the sides thereof, and rotatable connecting means between the measuring means and the body with the alignment means being rotationally selectable and spaced at different locations along the body to set the measuring means at predetermined differences in longitudinal position relative to a given location.

8. A gauging means for use in a layout prior to the subsequent cutting of insulating board of appreciable thickness at locations therealong by using a straight edge and cutting tool in the fabrication of structures specified as to inside dimensions, said gauging means comprising a multi-sided gauge body, having appendages on various sides of said body and spaced along said body, a linear measurer, and rotatable means of attachment one to the other, said gauge body positioning the linear measurer to indicate, in terms of the desired inside dimensions of the structure, the position of the straight-edge along which cutting tools may be guided to cut the insulating board to said dimensions.

9. Means for positioning a straight-edge which will guide various cutting tools on a workpiece into which various types of grooves are to be cut, said means consisting of an elongated linear measuring device having indicia relative to one end, an elongated multi-sided gauge body connected at one end to said one end of said linear measuring device, said gauge body having a plurality of abutments spaced around said body with said abutments having various spacings relative to said one end of said linear measuring device, said connection being rotatable to allow rotation of said gauge body about its longitudinal axis relative to said linear measuring device so that a selected one of said abutments can be brought into position for use with said linear measuring means, and said abutments being spaced along said gauge body so that by proper choice of an abutment the correct spacing of successive grooves can be directly read off from the indicia on the linear measuring means.

10. Means for positioning a straightedge to guide various cutting tools on a workpiece into which various types of grooves are to be cut to enable fabrication of ducts and like structures, said means comprising an elongated linear measuring device having indicia relative to one end, an elongated multi-sided gauge body connected at one end to said one end of said linear measuring device, said gauge body incorporating alignment means along sides thereof with said alignment means having various spacings relative to said one end of said linear measuring device, said connection being rotatable to allow rotation of said gauge body relative to said linear measuring device so that a selected one of said alignment means can be brought into position for use with said linear measuring means so that by proper choice of alignment means the successive positions of said straightedge, relative to the adjacent groove, cut, or edge, may be read from the linear measuring means directly in terms of the finished inside dimensions of the structure thus formed from said workpiece.

* * * * *